United States Patent
Derossi

[11] 4,264,852
[45] Apr. 28, 1981

[54] FOLLOWER DEVICE WITH DIFFERENTIATED SPEEDS FOR GYROCOMPASSES WITH MECHANICAL SUSPENSION

[76] Inventor: Piero M. Derossi, Corso Giovanni Lanza 55, Turin, Italy

[21] Appl. No.: 973,813

[22] Filed: Dec. 28, 1978

[30] Foreign Application Priority Data

Dec. 30, 1977 [IT] Italy ............................... 69957 A/77

[51] Int. Cl.³ ............................................. B64C 17/02
[52] U.S. Cl. .................................... 318/648; 318/640; 74/5.6 A; 74/5.7; 318/654
[58] Field of Search ............... 318/648, 649, 654, 640; 74/5.6 A, 5.6 D, 5.6 E, 5.7

[56] References Cited

U.S. PATENT DOCUMENTS

| | | | |
|---|---|---|---|
| 3,259,822 | 7/1966 | Burmeister et al. | 318/654 X |
| 3,551,905 | 12/1970 | Kuhne | 318/654 X |
| 3,760,170 | 9/1973 | Weber, Jr. | 318/640 X |
| 3,784,891 | 1/1974 | Burmeister | 318/648 |
| 3,875,488 | 4/1975 | Crocker et al. | 318/648 |

Primary Examiner—B. Dobeck
Attorney, Agent, or Firm—Montague & Ross

[57] ABSTRACT

A detector responsive to an angular offset between a gyrosphere of a gyrocompass and a tilt ring, forming part of a gimbal mounting therefor, controls a follower motor coupled through a reduction gearing with a suspension shaft for that mounting, the shaft being further coupled with a first synchro transmitter. A second synchro transmitter, electrically connected to several synchro receivers forming part of respective repeaters, is driven by a servomotor through a reduction gearing of step-down ratio 1:3 and is mechanically linked with a third synchro transmitter through a reduction gearing of step-down ratio 1:360, the third synchro transmitter being electrically connected to the first synchro transmitter for producing an error signal delivered through a feedback loop to the servomotor for keeping same slaved to the suspension shaft. The detector may comprise an optical sensor with a light source and two spaced-apart photoresistors mounted on the tilt ring and with a mirror on the gyrosphere reflecting light from the source onto the photoresistors which are connected in a bridge circuit so as to unbalance same in the event of an offset.

7 Claims, 3 Drawing Figures

FOLLOWER DEVICE WITH DIFFERENTIATED SPEEDS FOR GYROCOMPASSES WITH MECHANICAL SUSPENSION

FIELD OF THE INVENTION

My present invention relates to a gyroscopic system for the transmission of positional data from a gyrocompass to one or more loads aboard a vehicle.

BACKGROUND OF THE INVENTION

As is known, the purpose of the follower device in all gyrocompasses is to align an associated indication card, as well as the means (if any) for the transmission of the heading information to a remote load, with the position of the gyrosphere oriented by the gyroscopic effect of the rotating mass contained therein. In compasses with a gyrosphere mechanically suspended from a shaft, the follower has the further purpose of maintaining the cardanic suspension or gimbal mounted oriented in a direction strictly corresponding to that of the gyroscope spin axis, in order to prevent the transmission to the gyrosphere of disturbances caused by the movements of the vehicle on which the gyrocompass is installed. For this second purpose, the follower device of a gyrocompass with mechanical suspension must act with high speed and precision so that the phase difference between the gyrosphere and the cardanic suspension will always be at a minimum, even under the most severe dynamic conditions. Consequently, one must use a motor/reducer group with high acceleration and speed performances to actuate the compass shaft, and a high-resolution sensing for detecting the phase shifts between the gyrosphere and the cardanic suspension. For a correct operation, it is generally deemed that the follower system must be able to develop high accelerations with speeds up to 40°/sec.

These features, however, are not compatible with the requirements, particularly as concerns speed, of the system for the transmission of the positional data of the master compass to associated repeaters, a system which must operate with maximum speeds of about 10°/sec. Therefore, one accepts compromise solutions which are not completely satisfactory.

OBJECT OF THE INVENTION

The present invention has the object of providing a follower device adapted to satisfy, in the best way and at the same time, the contrasting requirements of the follower system between the gyrosphere and the cardanic suspension or gimbal mounting and of the data-transmitting system entraining one or more loads.

SUMMARY OF THE INVENTION

This object is attained, according to my invention, by the fact that the follower arrangement comprises a first servo system, operating with high resolution, speed and acceleration, which controls the repositioning of the gimbal mounting conforming to a displacement of the gyrosphere, and a slower second servo system, with a reduction gearing in a feedback loop, which controls the entrainment of the associated load or loads by the shaft of the gimbal mounting.

With such a two-speed follower system, it becomes possible to satisfy in the best manner the necessity of avoiding the application of interfering torques to the gyrosphere and, at the same time, to actuate the data-transmitting system at speeds suitable for its requirements and compatible with the navigation necessities.

For sensing the phase shifts between the gyrosphere and the cardanic suspension, I prefer to use an optical detector which is adapted to operate with a high degree of resolution and compares favorably with known magnetic detectors in that it applies no reaction torque to the gyrosphere. This optical detector comprises a pair of photoresistances inserted in a bridge circuit, illuminated by light sources through reflection on a mirror, the photoresistances and the light sources being mounted on a part of the cardanic suspension and the mirror on the gyrosphere. Such a detector, not requiring any particular machinings, is also inexpensive.

Advantageously, the second servo system of lower velocity is constructed in modular form and may be omitted or removed without altering the compass structure. This allows to unify the construction of compasses with a two-speed transmission system, embodying my present invention, and of simpler compasses having only the high-speed servo system while lacking a data-transmission system; it also enables a particularly inexpensive construction of the latter type of compass, designed for craft of modest type.

BRIEF DESCRIPTION OF THE DRAWING

An embodiment of the invention is described hereinafter by way of nonlimiting example and with reference to the accompanying schematic drawing in which.

SPECIFIC DESCRIPTION

Figure 1:
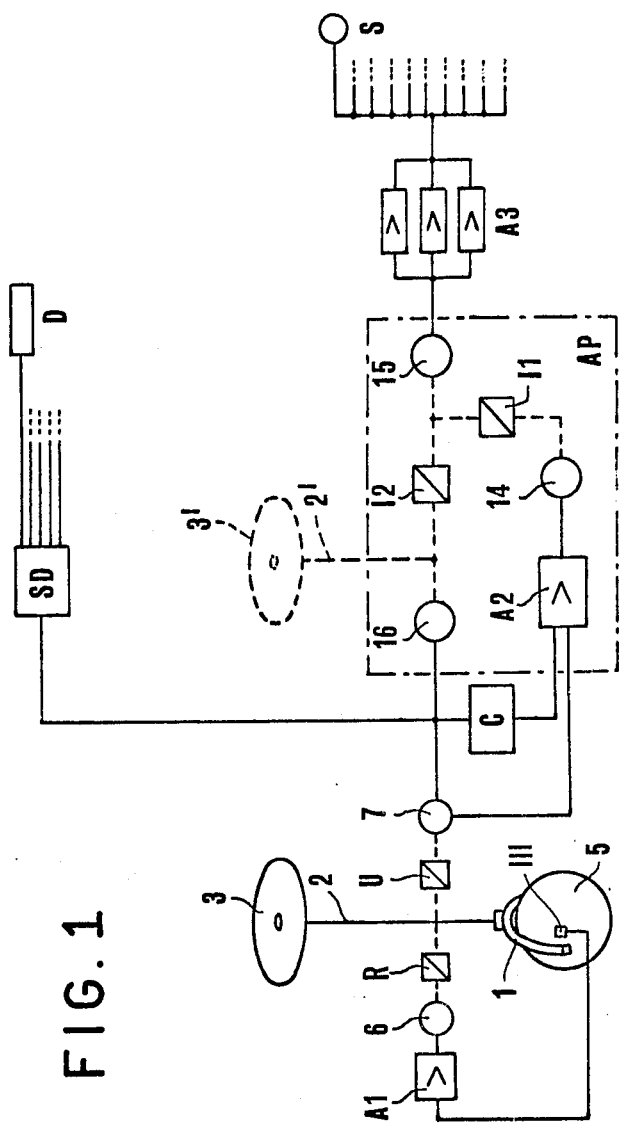
FIG. 1 shows the general layout of an installation according to the invention.

In FIG. 1, reference 1 indicates a supporting fork of the cardanic suspension of a gyrosphere 5 forming part of a master compass. Fork 1 is keyed to a compass shaft 2 carrying the indication card 3. At III is indicated a sensor or detector of the phase difference between the gyrosphere and the cardanic suspension or gimbal mounting, described in more detail hereinafter. The error signal furnished by sensor III is amplified at A1 and is utilized for controlling a follower motor 6 which, through a reducing gearing R, entrains the compass shaft 2 in such a direction as to tend to reduce the error detected by the sensor III. The described parts constitute a known servo loop thanks to which the compass shaft follows the gyrosphere, oriented by the gyroscope contained therein, and thus furnishes through the card 3 the heading information of the vehicle on which the installation is mounted. These parts, known per se, constitute the only elements in a system according to my invention that can be freely designed to attain the best follower conditions, and hence high acceleration and velocity, without any consideration of the requirements of the data-transmitting system.

The described assembly of the master compass comprises furthermore a mechanical transmission U, with a one-to-one speed, through which the compass shaft 2 entrains a small electromagnetic device 7 of synchro-transmitter type which, for the dual reason of being of low power and therefore having a reduced inertia and being coupled without step-up, can keep pace with the high speeds and accelerations of the master-compass follower system without impeding it.

Figure 2:
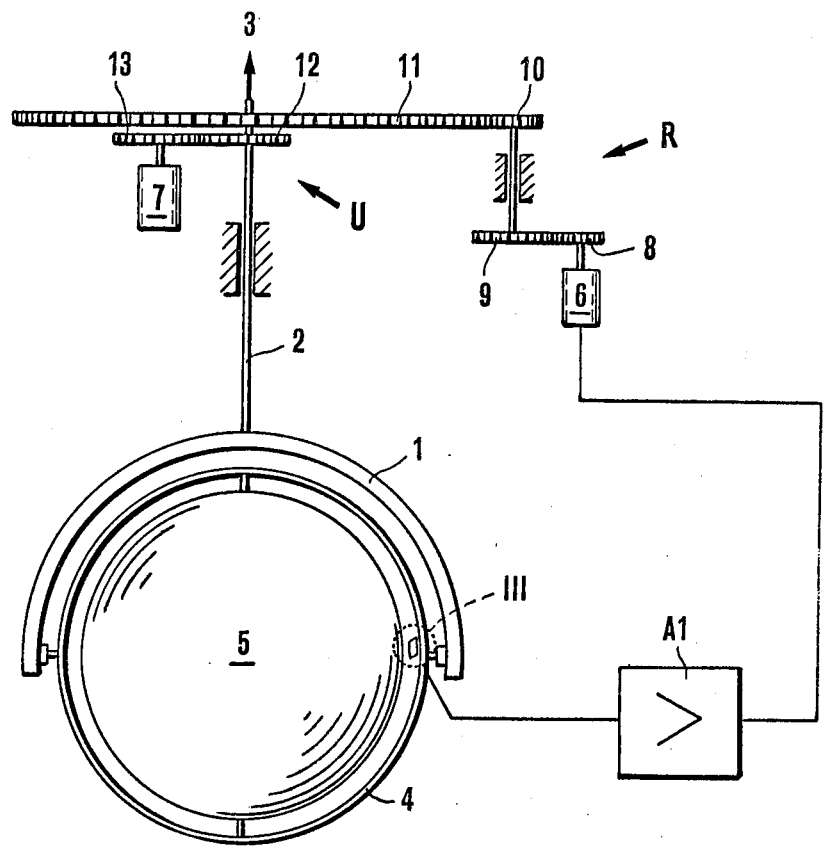
FIG. 2 shows in greater detail the assembly of a master compass included in the assembly of FIG. 1.

As indicated in more detail in FIG. 2, the supporting fork 1 carries, pivoted along an at least approximately horizontal axis, a tilt or gimbal ring 4 onto which, along an axis perpendicular to the one just referred to, the gyrosphere 5 is pivoted. The sensor III is mounted between the tilt ring 4 and the gyrosphere 5. The servomotor 6 entrains the compass shaft 2 through two pairs of toothed wheels 8-9 and 10-11 with a total step-down ratio which may be, e.g., of 1:1080. Shaft 2 entrains the synchro transmitter 7 through a pair of identical toothed wheels 12-13. In conventional compasses with synchro-transmission system, the synchro transmitter corresponding to device 7 is coupled with a step-up of 1:360 and pilots the synchro receivers of the loads installed on the vehicle; this type of coupling imposes upon the follower system of the master compass the limitations inherent in the transmission system.

According to my present invention, there is instead provided a second servo positioning system, generally indicated at AP in FIG. 1, whose function is to follow, with more moderate speed and acceleration, the follower system of the master compass, i.e. practically to follow the compass shaft 2 forming part of the cardanic suspension of the gyrosphere 5, and to generate the signals required for the piloting of the synchro receivers of the users. Follower system AP comprises a servomotor 14 which through a reduction gearing I1, having e.g. a ratio of 1:3, entrains a synchro transmitter 15 and through a further reduction gearing I2, having a ratio of 1:360, entrains another synchro transmitter 16. The latter is electrically coupled in a feedback loop with the synchro transmitter 7 of the master compass, and the error signal representing any disalignment between the synchros 16 and 7 is sent to a servo amplifier A2 controlling the servomotor 14 in a sense tending to reduce the error. Therefore, the synchro transmitter 16 follows—with a certain relative lag—the synchro transmitter 7 and thus repeats the position of the compass shaft 2. From the mechanical transmission connected to the synchro transmitter 16, a shaft 2' may be branched off with an indication card 3' which may supplement the card 3 or replace it.

From a consideration of the above-stated transmission ratios it will be seen that the synchro transmitter 15 rotates through angles 360 times those of the synchro transmitter 16, that is, it completes one turn for each degree of the compass indication, as is normally required for the transmission to the repeaters. Its signals, possibly amplified at A3, are therefore distributed to the network of repeaters (not shown) actuated by synchro receivers S. Thus, speed and acceleration of the servo system AP are not related to the follower requirements of the master compass and may therefore be selected with the optimum consideration for the requirements of the transmission system.

To the servo amplifier A2 of the second servo system AP a circuit C may further be connected for the correction of the delta angle—a circuit known per se in the installations of gyrocompasses—as well as an analog/digital converter SD for the energization of digital indicators D.

Figure 3:
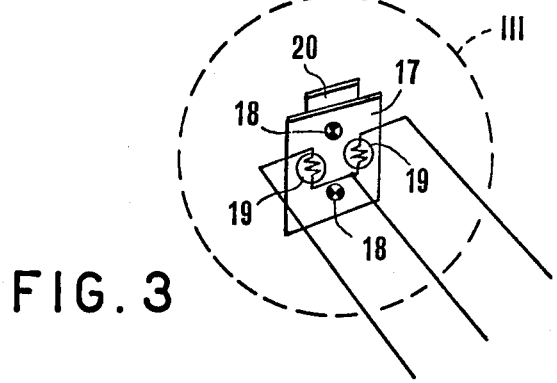
FIG. 3 shows an optical sensor installed in a zone designated III in of FIG. 2.

For purposes of the present invention, the detector of the phase shift between the gyrosphere and the cardanic suspension could generally be of any kind, yet I prefer to use a particular optical sensor allowing the maximum exploitation of the advantages obtainable by my invention. This sensor, schematically represented by FIG. 3, comprises a support 17 mounted on the tilt ring 4 of the gyrocompass, carrying one or more luminous sources 18 and a pair of photoresistances 19 spaced apart from each other substantially in the direction of the relative displacement between plate 17 and the confronting zone of the gyrosphere 5 on which a mirror 20 is disposed.

Any displacement of mirror 20 with respect to plate 17—which signifies a displacement of the gyrosphere with respect to the tilt ring and thus to the cardanic suspension—modifies the ratio between the illuminations of the two photoelectric cells 19 by the lamps 18 through reflection on mirror 10, thereby varying the ratio between the electrical resistances thereof. By inserting the latter in a bridge circuit, well known per se, it is therefore readily possible to obtain an error signal adapted to be processed in the servo amplifier A1.

The structure of the described sensor is rather simple, economical and sturdy, and it presents the particular advantage of not applying any reation torque to the gyrosphere and therefore of not disturbing its correct orientation in any way. On the other hand, it can provide a completely satisfactory resolution capacity.

For the realization of a gyrocompass lacking a data-transmitting system, it is sufficient to remove or omit from the described assembly the system AP which, to that end, may be constituted in modular form. The master-compass assembly, on the other hand, may remain as it is or be deprived of the synchro transmitter 7 without undergoing any other modification. This enables, accordingly, a wide unification in the construction of compasses with and without a transmission system, by extending in an economical way to the latter the high performance characteristics of the former.

I claim:
1. In a gyroscopic system including a gyrosphere suspended from a shaft by a gimbal mounting, detector means carried on said gimbal mounting for sensing deviations between the angular positions of said gyrosphere and said shaft, drive means controlled by said detector means for rotating said shaft to eliminate said deviations, and follower means for transmitting positional data from said shaft to a remote load,
   the improvement wherein said follower means comprises:
   a first synchro transmitter mechanically coupled with said shaft;
   a feedback loop including a servo motor and a second synchro transmitter driven by said servo motor through a reduction gearing, said second synchro transmitter being electrically coupled with said first synchro transmitter to provide an error signal representative of any positional disalignment therebetween for operating said servo motor to reduce said disalignment; and
   data-transmission means linking said servo motor with the remote load.

2. A system as defined in claim 1 wherein said data-transmission means comprises a thrid synchro transmitter driven by said servo motor.

3. A system as defined in claim 2 wherein said data-transmission means further comprises another reduction gearing between said servo motor and said third synchro transmitter.

4. A system as defined in claim 1, 2 or 3 wherein the reduction gearing in said feedback loop has a step-down ratio of 1:360, the coupling between said shaft and said first synchro transmitter having a one-to-one transmission ratio.

5. A system as defined in claim 4, further comprising a compass card driven by said servo motor through the reduction gearing in said feedback loop.

6. A system as defined in claim 1, 2 or 3 wherein said detector means comprises a light source on said gimbal mounting and photoelectric means carried on said gyrosphere for illumination by said light source.

7. A system as defined in claim 6 wherein said photoelectric means comprises a pair of photoresistances inserted in a bridge circuit.

* * * * *